US011705150B2

(12) United States Patent
Waine et al.

(10) Patent No.: US 11,705,150 B2
(45) Date of Patent: Jul. 18, 2023

(54) MACHINE LEARNING BASED GENERATION OF SYNTHETIC CROWD RESPONSES

(71) Applicant: NVIDIA Corporation, Santa Clara, CA (US)

(72) Inventors: Benjemin Thomas Waine, Cheshunt (GB); Amy Rose, Chapel Hill, NC (US); Andrew James Woodard, High Wycombe (GB)

(73) Assignee: NVIDIA Corporation, Santa Clara, CA (US)

( * ) Notice: Subject to any disclaimer, the term of this patent is extended or adjusted under 35 U.S.C. 154(b) by 168 days.

(21) Appl. No.: 17/168,905

(22) Filed: Feb. 5, 2021

(65) Prior Publication Data

US 2022/0254368 A1    Aug. 11, 2022

(51) Int. Cl.
| | |
|---|---|
| *G10L 25/57* | (2013.01) |
| *G06N 3/08* | (2023.01) |
| *G10L 15/16* | (2006.01) |
| *G10L 15/18* | (2013.01) |
| *G06N 3/045* | (2023.01) |

(52) U.S. Cl.
CPC .............. *G10L 25/57* (2013.01); *G06N 3/045* (2023.01); *G06N 3/08* (2013.01); *G10L 15/16* (2013.01); *G10L 15/18* (2013.01)

(58) Field of Classification Search
CPC ......... G10L 25/57; G10L 15/16; G10L 15/18; G06N 3/0454; G06N 3/08
See application file for complete search history.

(56) References Cited

U.S. PATENT DOCUMENTS

| | | | |
|---|---|---|---|
| 2006/0206332 A1* | 9/2006 | Paek | G10L 15/063 704/E15.04 |
| 2019/0034814 A1* | 1/2019 | Amer | G06K 9/6234 |
| 2021/0321163 A1* | 10/2021 | Ramos | H04N 21/2187 |
| 2022/0114390 A1* | 4/2022 | Baughman | G10L 13/04 |

* cited by examiner

*Primary Examiner* — Bhavesh M Mehta
*Assistant Examiner* — Edward Tracy, Jr.
(74) *Attorney, Agent, or Firm* — Taylor English Duma L.L.P.

(57) ABSTRACT

Systems and methods for generating real-time synthetic crowd responses for events, to augment the experience of event participants, remote viewers, and the like. Various sensors monitor the event in question, and various event properties are derived from their output using an event state model. These event properties, along with various event parameters such as score, time remaining, etc., are then input to a machine learning model that determines a real-time synthetic audience reaction tailored to the immediate state of the event. Reaction parameters are used to generate a corresponding crowd or audience audio signal, which may be broadcast to event participants, viewers, spectators, or anyone who may be interested. This instantaneous, realistic crowd reaction more closely simulates the experience of events with full on-site audiences, enhancing the viewing experience of both event participants and those watching.

22 Claims, 12 Drawing Sheets

MACHINE LEARNING BASED GENERATION OF SYNTHETIC CROWD RESPONSES

BACKGROUND

Embodiments of the disclosure relate generally to machine learning systems. More specifically, embodiments of the disclosure relate to machine learning based generation of synthetic crowd responses.

SUMMARY

Events, such as sporting matches, concerts, lectures, and the like, often have audiences. The reactions of these audiences are often significant contributors to the overall experience of both viewers and participants, lending an energy and emotion that can greatly enhance the impact and atmosphere of an event. Accordingly, events that cannot have audiences are often diminished. Sporting events that disallow fan attendance due to, for example, the presence of infectious diseases, structural hazards, the risk of violence, or other dangers to those present, may be safer, but present an experience lacking in fan energy and excitement.

Attempts to compensate for the lack of an audience commonly fall short. Added effects such as "laugh tracks," pre-recorded crowd noise, and the like may add an element of crowd reaction, but cannot be tailored to capture the spectrum of human reactions. Conventional effects thus leave viewers with an experience that is often perceived as artificial, and lacking in genuine emotion or immersion.

Accordingly, systems and methods are described herein for machine learning-based, real-time generation of more realistic crowd reactions during events. Sensors (e.g., cameras, microphones, or other input devices) determine the current state of the event, and are input to a machine learning system along with relevant event parameters. From these inputs, the machine learning system is trained to output a crowd reaction. A corresponding audio signal is then determined. This audio signal can then be transmitted for play at, e.g., the event itself, to improve the participant experience, and to remote viewers to increase event immersiveness and impact.

The machine learning system may have any suitable parameters or quantities as inputs. For example, as crowd reactions are often heavily dependent on the current state of the event, e.g., the crowd often reacts in real time to scores, jokes, and the like, the machine learning system may have inputs that include event information such as the identities of event participants, the time remaining in the event, scores, team identities and which team is the home/away team, information such as the importance level of the event (e.g., whether the event is a playoff game or not), or audio signals detected at the event itself. These audio signals may be any audio detected at the event, such as sounds or noises made by any event participants, coaches, spectators, moderators, commentators, or referees. For example, crowd noise is often a real-time reaction to referee calls, or moderator comments. Similarly, crowds may be expected to react to sideline player antics or even the actions of ardent fans.

System inputs may be of any form, including audio signals and video signals. Both audio and video may be used to identify other event parameters, which may serve inputs themselves. For instance, video of an event such as a sporting match may be used to determine ball(s)/object(s) position(s), player(s) position(s), goal location(s), and thus provide a real-time indication that a goal or other objective was achieved, where the occurrence of a score may be an input itself, strongly prompting a crowd noise output. As another example, event audio may be transcribed such as by natural language processing ("NLP") systems, with the resulting transcribed text being a system input that may indicate, e.g., player requests for audience participation or other speech that may prompt an audience response. Inputs may also be received from a user making direct entries. Such entries may supplement inputs from sensors to provide additional context. Such entries may be independent of other sensor input to provide additional inputs for training or for independent use in generating and identifying an appropriate crowd output. Systems of embodiments of the disclosure may thus take as inputs both audio/video signals from the event itself, as well as various parameters derived from these audio/video signals, providing a more comprehensive detailing of the real-time state of the event.

These video recordings may be video of any portion of the event which may convey information as to the state of the event. For example, recordings of the sidelines of an event such as a sporting match may show player reactions that serve as indicators of corresponding crowd reactions. Recordings of various objects of or within the event, such as the ball, player uniforms or insignias, sideline or goal line pylons, and the like may convey valuable information as to, e.g., penalties, whether a goal was achieved, etc., each of which a crowd may audibly react to. Recordings of any location within or surrounding the event may also indicate information such as the weather, temperatures, or other conditions, which may also have an impact on crowd noise or reactions. Additionally, recordings of one or more event participants may be particularly relevant to crowd noise, such as celebrity players, referees who may make critical calls, event keynote speakers, lead singers, or any other figures who may be of particular note to a crowd and whose actions may be particularly prone to elicit a crowd reaction.

Audio/video signals, as well as other sensor input, may also be used to determine other inputs such as participant positions, various object positions, or any participant actions. Embodiments of the disclosure contemplate use of any quantities or attributes derived from any input data in any manner. In this case, neural network-based pose and/or object recognition techniques, computer vision-based processes, or the like may be employed to recognize particular positions, poses, or actions, that may tend to generate a crowd response. For example, the system may be trained to recognize certain player stunts, celebrations, or the like, and generate crowd noise accordingly.

Outputs of the machine learning system indicate the crowd noise type and level that can be generated in response to the real-time event state. Outputs can thus include a crowd noise volume level, crowd noise type (cheers, boos, chants, etc.), participant identities (cheers for a particular player, etc.), or the like. Different outputs may also be generated for different event participants. For example, one set of crowd noise outputs can be generated and played for the home team, while another different set of crowd noise outputs can be generated for the visiting sideline. This can more effectively simulate the different reactions that different portions of the audience, seated at different locations, may have, further enhancing and making more realistic the experience of event participants and viewers.

Embodiments of the disclosure may be applied to generate synthetic crowd or audience responses for any type of event. While a natural application may be sporting events, embodiments of the disclosure may be equally applied to any other type of event in which crowd or participant noise may occur responsive to event itself, such as any form of entertainment event like concerts, shows, or the like, any political event such as a rally, or any broadcast program that may have an audience.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for generating real-time synthetic crowd responses for events, to augment the experience of event participants, remote viewers, and the like. Various sensors monitor the event in question, and various event properties are derived from their output using an event state model. These event properties, along with various event parameters such as score, time remaining, etc., are then input to a machine learning model that determines a real-time synthetic audience reaction tailored to the immediate state of the event. Reaction parameters are used to generate a corresponding crowd or audience audio signal, which may be broadcast to event participants, viewers, spectators, or anyone who may be interested. This instantaneous, realistic crowd reaction more closely simulates the experience of events with full on-site audiences, enhancing the viewing experience of both event participants and those watching.

Figure 1:
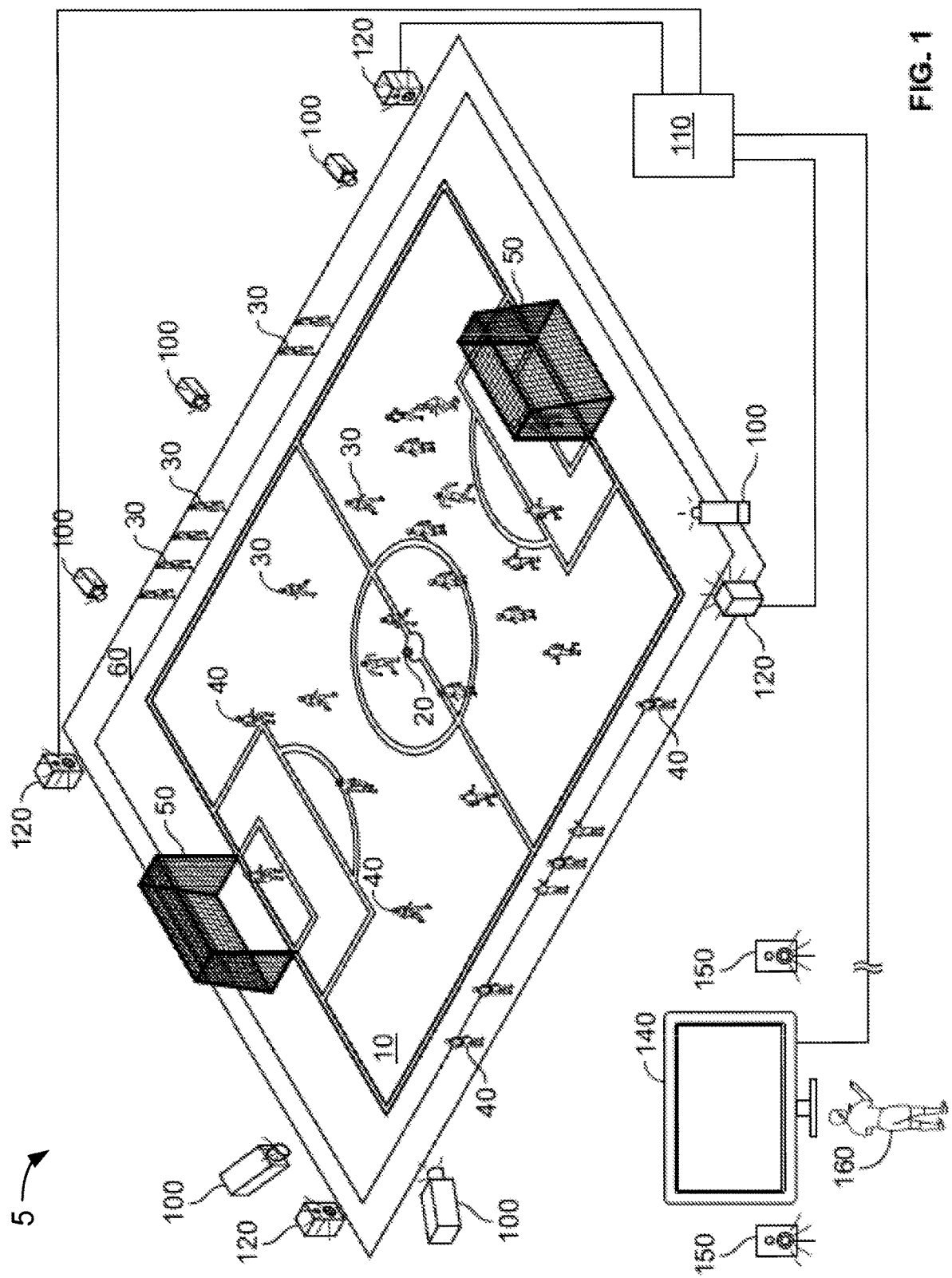
FIG. 1 is an isometric view of an event site, conceptually illustrating operation of an exemplary synthetic crowd response generation system in accordance with embodiments of the disclosure.

FIG. 1 is an example isometric view of an event site, conceptually illustrating operation of an exemplary synthetic crowd response generation system in accordance with embodiments of the disclosure. Here, a synthetic crowd response generation system 5 is implemented around a field 10 on which an event, in this case a soccer or football game, is played. System 5 includes a number of sensors 100, which may be cameras, microphones, or any other sensors capable of detecting any property of the game, a processor 110, a number of speakers 120. The system 5 is in electronic communication with any number of remote viewer systems that each include a display 140 and one or more speakers 150. The game involves any number of participants and/or objects, in this exemplary case including a ball 20, first team players 30, second team players 40, and goalposts 50. Players 30, 40 of each team may be actively playing upon field 10, or standing on one of the sidelines 60 as shown.

Any number of sensors 100 may be employed, to detect any one or more properties of the game as it is ongoing. In at least one embodiment of the disclosure, at least some of the sensors 100 are cameras capturing video of the game as it is played, and transmitting the captured video images to processor 110. In at least one embodiment of the disclosure, at least some of the sensors 100 are microphones capturing audio of the game, various players 30, 40, and the like, and transmitting audio signals to processor 110. In at least one embodiment of the disclosure, at least some of the sensors 100 are other types of sensors monitoring other event properties, e.g., pressure sensors located on or near game boundaries to determine whether ball 20 landed in-bounds or out of bounds. In at least one embodiment, a user may provide input to supplement the data received by the sensors. Such data may provide context to the event or may identify aspects of the event that would not likely be detected by the sensors. In at least one embodiment, a user may provide input that is independent of the sensors. Such data may likewise provide context to the event or may identify aspects of the event that would not likely be detected by the sensors.

Processor 110 then performs synthetic crowd response generation as above, determining the real-time state of the game from received sensor 100 video. For example, processor 110 may determine ball 20 position, the identity, pose, and location of each player 30, 40 on field 10, expressions and/or speech of each player 30, 40 (including players 30, 40 on sidelines 60), and the like. Processor 110 may also receive supplementary real-time game information, such as the current score, whether the game is a playoff game, the time remaining, whether the game is in overtime, a promotion or demotion game, a rivalry game, and/or any other desired game information. From this information, processor 110 may then determine crowd noise parameters such as a crowd noise volume, and a more precise content of the crowd noise such as a chant to be initiated, words or phrases recited within the crowd noise, the nature or emotion of the crowd noise, i.e., whether the crowd noise is approving (cheers), disapproving (jeers), or the like.

Processor 110 then uses these parameters to generate a corresponding synthetic crowd noise signal, which is transmitted to and played by speakers 120 and speakers 150. In this manner, synthetic crowd noise may be played to enhance the immersiveness and experience of players 30, 40 and others at the game or event, as well as viewers 160 watching remotely from, e.g., displays 140.

While FIG. 1 illustrates the event in question as a sporting event, one of ordinary skill in the art will observe that embodiments of the disclosure may be employed to generate audience responses for any type of event, whether sporting or otherwise. That is, the event may be any type of event, including any sporting event of any sport or sporting activity, a practice or scrimmage, any broadcast media program, a concert, rally, or any other large or public gathering, any show such as a comedy or variety show, and the like.

Figure 2:
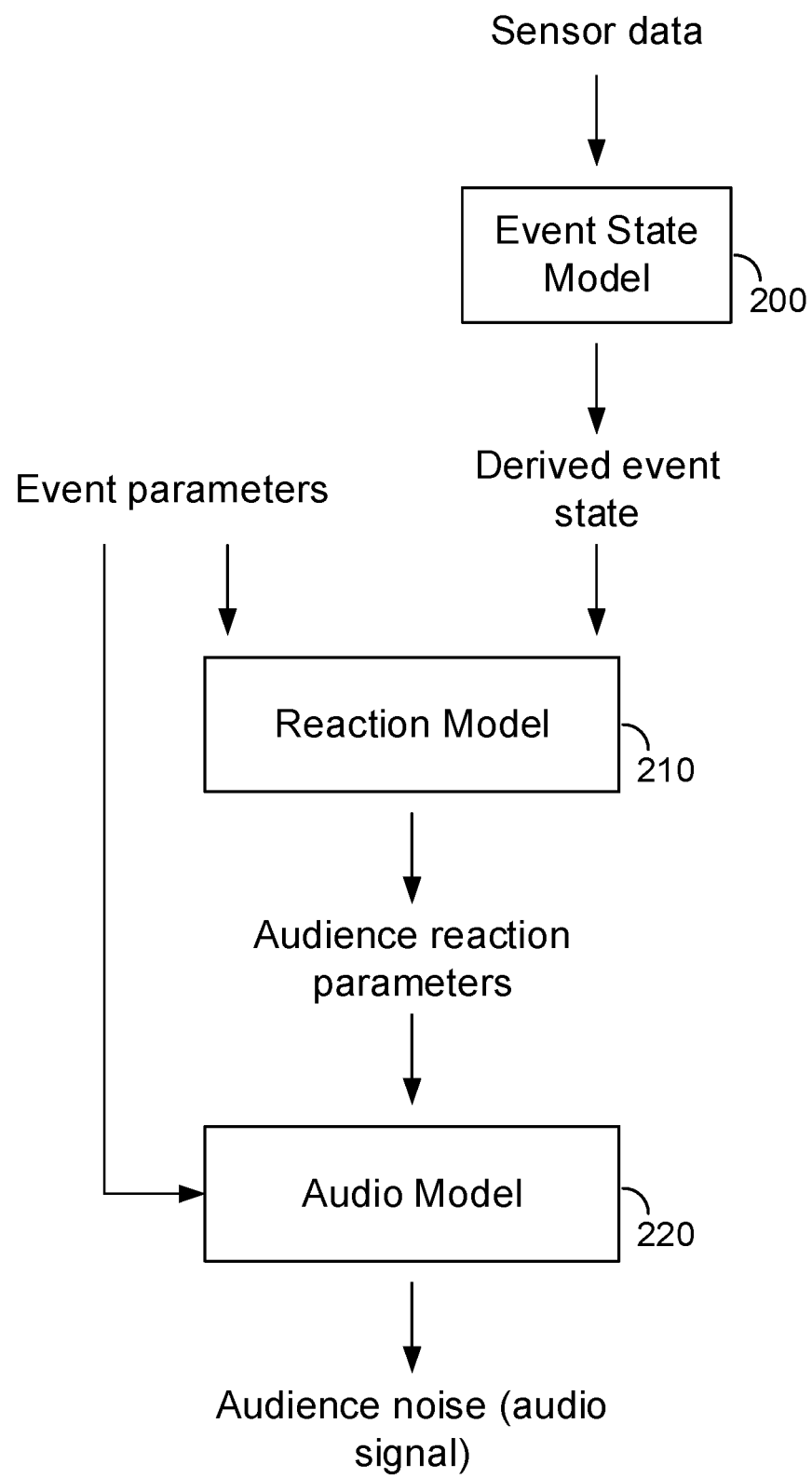
FIG. 2 is a flowchart conceptually illustrating further details of crowd response generation in accordance with embodiments of the disclosure.

FIG. 2 is a flowchart conceptually illustrating further details of crowd response generation in accordance with embodiments of the disclosure. In particular, FIG. 2 illustrates operation of instruction modules of processor 110, where these modules contain instructions for implementing code for an event state model 200, a reaction model 210, and an audio model 220. Initially, data from sensors 100 is transmitted to processor 110 and input to event state model 200, which determines values of various event state variables therefrom. In some embodiments of the disclosure, event state model 200 includes one or more machine learning models trained to characterize an event state from event data. As one example, the event state model 200 may include one or more convolutional neural networks (CNNs) or other machine learning models configured to take in game video and audio from sensors 100, and to identify event properties such as ball 20 position, the position of each player 30, 40, field 10 boundaries, goalpost 50 positions, or any other desired game state or property. CNNs and other machine learning models for determining object positions and/or poses from image information are known, and any such models are contemplated by embodiments of the disclosure. These models may be trained using training datasets that include images of game objects sought to be identified, labeled with their identities and locations. Such position or location variables may also be determined by, for example, known computer vision-based processes for determining object locations from multiple different images.

The event state model 200 may also include one or more CNNs or other machine learning models for conversion of input audio to text, e.g., transcription models carrying out speech to text functions. The resulting text may be player 30, 40 speech, referee speech, fan speech, or the like. Speech from any source, located anywhere on or near field 10, is contemplated. Speech to text models and methods are known, and any such models and methods are contemplated by embodiments of the disclosure.

The event state model 200 may also include one or more CNNs or other machine learning models configured to take in game video and audio from sensors 100, and to identify as output the identities of certain players. For example, models may be trained to identify well-known or popular players 30, 40 on each team. The models may be trained using training datasets that include images of these players, labeled with their identities. Accordingly, the derived event state, or the output of event state model 200, may include the identities of event participants.

The event state model 200 may also include one or more CNNs or other machine learning models configured to take in-game video and/or audio from sensors 100, and to identify as output player 30, 40 poses. The models may be trained using training datasets that include images of people, labeled with their poses.

Embodiments of the disclosure thus contemplate event state models 200 programmed to receive as input sensor data such as audio and/or video signals, and to generate as outputs real-time values for quantities including event object identities and locations, as well as any participant speech, poses, and locations. In further embodiments of the disclosure, any other quantities or properties of any event object or participant may be determined as desired.

In embodiments of the disclosure, reaction model 210 may include one or more machine learning models, such as CNNs, configured to take in the derived event state, i.e., the outputs of event state model 200, as well as other event parameters, and to generate as output various audience reaction parameters from which an audience reaction audio signal may be generated. The event parameter inputs may be any properties or attributes of the event. For example, as above, when the event is a sporting event as in FIG. 1, these parameters may include the current score, whether the game is a playoff game, time remaining, whether the game is in overtime, and/or any other desired game information.

Reaction model 210 may include one or more CNNs, other machine learning models, or logic sets configured to determine other intermediate event variables from the output of event state model 200. For example, reaction model 210 may include logic, or machine learning models, for determining, from ball 20 position and goal 50 position, whether a goal has been scored. The fact that a goal has been scored may then be input to subsequent models of reaction model 210. Similarly, speech from an identified referee may be used to determine whether a penalty was assessed, and the nature of the penalty. Any such variables, determined from any previously-derived event state information or received event parameters, is contemplated and may be input to any portion of reaction model 210.

Reaction model 210 may further include one or more CNNs, other machine learning models, configured to take in the derived event state, any intermediate variables determined from this derived event state, and the various received event parameters, and generate as output values of audience reaction parameters. In some embodiments, and as above, inputs may include player 30, 40 positions, their identities, and the team to which they belong, field 10 boundary locations, ball 20 position, goalpost 50 locations, detected speech, whether a goal was scored, penalty occurrences, the current score, whether the game is a playoff game, time remaining, whether the game is in overtime, and the like. Any suitable values for any suitable variables are contemplated.

Reaction model 210 may be trained to determine values of audience reaction parameters as output, from the above inputs. Such outputs may be any parameters defining an audience or crowd noise signal. In some embodiments of the disclosure, these parameters may include noise level, whether the crowd noise is approving or disapproving (e.g., cheering, singing, chanting, or jeering, etc.), chants for a team or player, words or phrases recited within the crowd noise, or the like.

Reaction model 210 may be trained using training sets that include sets of the above inputs, with labeled values of the output parameters. Training sets may include a sufficient number of sets covering various game or event conditions and their associated output labels, so that real-time output yields sufficiently accurate crowd reactions. In this manner, model 210 may accurately correlate event occurrences with accurate or appropriate crowd reactions. For example, model 210 may be trained to generate cheer parameters when a goal is scored by the home team, but silence or boos when a goal is scored by the visiting team, with the volume increasing when the goal is scored in overtime, during a playoff game, at the end of the game, when the game is tied, or the like. Similarly, model 210 may be trained to generate boos when a penalty is assessed on a home team player, and cheers when a penalty is assessed on a visiting team player. Likewise, known team cheers may be initiated upon events such as a home team goal scored, at halftime, when no loud crowd noise has occurred for an excessive period of time, or the like.

In some embodiments of the disclosure, reaction model 210 may generate different outputs for different event participants. For example, reaction model 210 may generate one set of crowd noise outputs for the home team, while another different set of crowd noise outputs can be generated for the visiting sideline. This can more effectively simulate true audiences, in which audience members may cheer in differing manner depending on their location. This differential or location-dependent audience reaction may further increase realism and immersiveness for event participants as well as remote viewers.

Audio model 220 may be any logic or machine learning model for converting the audience or crowd reaction parameter output of reaction model 210, as well as received event parameters, to an audio signal. In some embodiments of the disclosure, audio model 220 may store audio data for audiences of the specific event occurring, and may play back this audio data according to the audience reaction parameters received. As one example, audio model 220 may store clips of audio taken from audiences for an exemplary game, or recorded from a previous game between the two teams currently playing, including a baseline audio clip, various popular cheers for those teams, and clips of various crowd reactions such as boos, cheers, and the like. These clips may then be retrieved as appropriate from the audience reaction parameters, and played back at the volume or other audio settings specified by the parameters. For instance, when audience reaction output from reaction model 210 specifies loud cheers as a result of a goal detected as being scored by the home team in overtime, the audio model 220 may be programmed to retrieve the corresponding home team cheer clip, and play this clip back at the volume level specified by the parameters. Similarly, when audience reaction output from reaction model 210 specifies a chant of a particular player's name as a result of a goal scored by that player, the audio model 220 may be programmed to retrieve the chant of that player's name, and play this clip back at the specified volume level. As may be observed by one of ordinary skill in the art, reaction model 210 may be configured and trained to specify any reaction to a particular event occurrence, and audio model 220 may be programmed to retrieve and play back, in real-time, corresponding audio.

Figure 3:
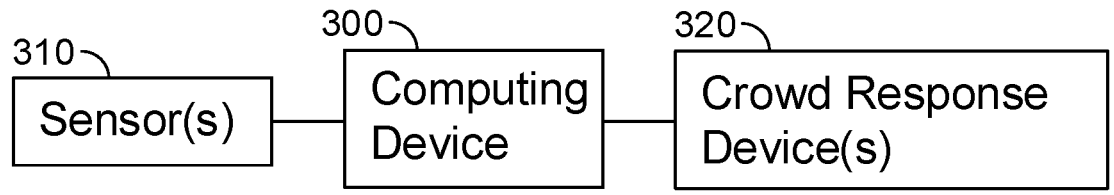
FIG. 3 is a generalized embodiment of an illustrative electronic computing system constructed for use according to embodiments of the disclosure.

FIG. 3 is a block diagram of an illustrative system constructed for use according to embodiments of the disclosure. Here, the system comprises a computing device 300, one or more sensors 310, and one or more crowd response devices 320. Computing device 300, which may be an implementation of processor 110 and may further be any electronic computing device containing processing circuitry capable of carrying out the synthetic audience response generation operations of embodiments of the disclosure, is in electronic communication with both a number of sensors 310 and a number of crowd response devices 320. In operation, sensors 310, which may correspond to one or more cameras 100 or other sensors of FIG. 1, may capture and transmit any desired images to computing device 300, which then carries out the above described synthetic audience response generation processes, determining from the output of sensors 310 and other data a real-time audible audience reaction. Crowd response devices 320, which include for example speakers 120 and 150, then broadcast this audible reaction for any desired listeners.

The system of FIG. 3 may be any system capable of real-time audience reaction generation and broadcast. As one example, the system of FIG. 3 may be a computer-based system located on-site at an event such as the game of FIG. 1. As another example, the system of FIG. 3 may be located at least partially remote. For instance, computing device 300 may be a cloud-based computing device or other digital computing device located remote from the event, and in communication with sensors 310 and crowd response devices 320 via a communications medium such as the public Internet.

Figure 4:
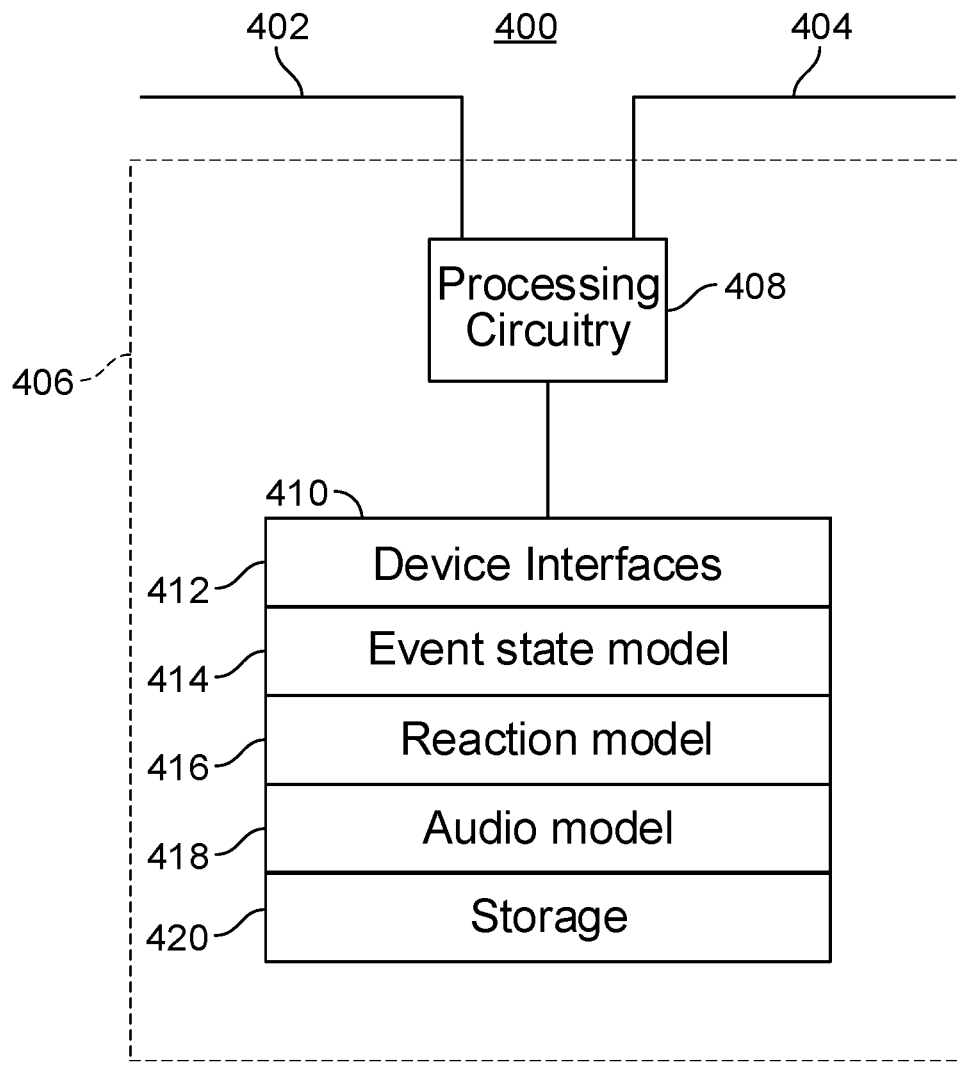
FIG. 4 is a generalized embodiment of an illustrative computing device constructed for use according to embodiments of the disclosure.

FIG. 4 is a generalized embodiment of an illustrative computing device 300 constructed for use according to embodiments of the disclosure. Here, device 400 may be a server computer programmed to execute the synthetic crowd response generation processes of embodiments of the disclosure. Device 400 may receive content and data via I/O paths 402 and 404. I/O path 402 may provide content and data to the various devices 200, 230, while I/O path 404 may provide data to, and receive content from, one or more content search servers 230. Like the user equipment device 300, the device 400 has control circuitry 406, which includes processing circuitry 408 and storage 410. The control circuitry 406, processing circuitry 408, and storage 410 may be constructed, and may operate, in a similar manner to the respective components of user equipment device 300.

Storage 410 is a memory that stores a number of programs for execution by processing circuitry 408. In particular, storage 410 may store a number of device interfaces 412, as well as modules of the above described synthetic audience reaction generation application. The synthetic audience reaction generation application may include an event state model module 414, a reaction model module 416 for generating synthetic audience reactions partially from the outputs of event state model module 414, an audio model module 418 for converting the reaction output of reaction model module 416 to one or more audio signals, and a storage 420 which may store parameters and data used by any of the above modules. For example, storage 420 may store various audio clips retrieved and played back by audio model module 418. The device interfaces 412 are interface programs for handling the exchange of commands and data with the various devices 100, 120, 140, and/or 150. Event state model module 414 is one or more programs for executing the event state model 200. Reaction model module 416 includes code for executing the reaction model 210, to determine audience reaction parameters from received event parameters and the derived event state output of event state model module 414. Audio model module 418 is a module for performing the above-described conversion of audience reaction parameters to audio signals for broadcast to the event and/or other viewers.

The device 400 may be any electronic device capable of electronic communication with other devices and performance of synthetic audience reaction generation processes described herein. For example, the device 400 may be a server, or other networked computing device in electronic communication with sensors 310 and crowd response devices 320. The device 400 may alternatively be a laptop computer or desktop computer configured as above.

Figure 5:
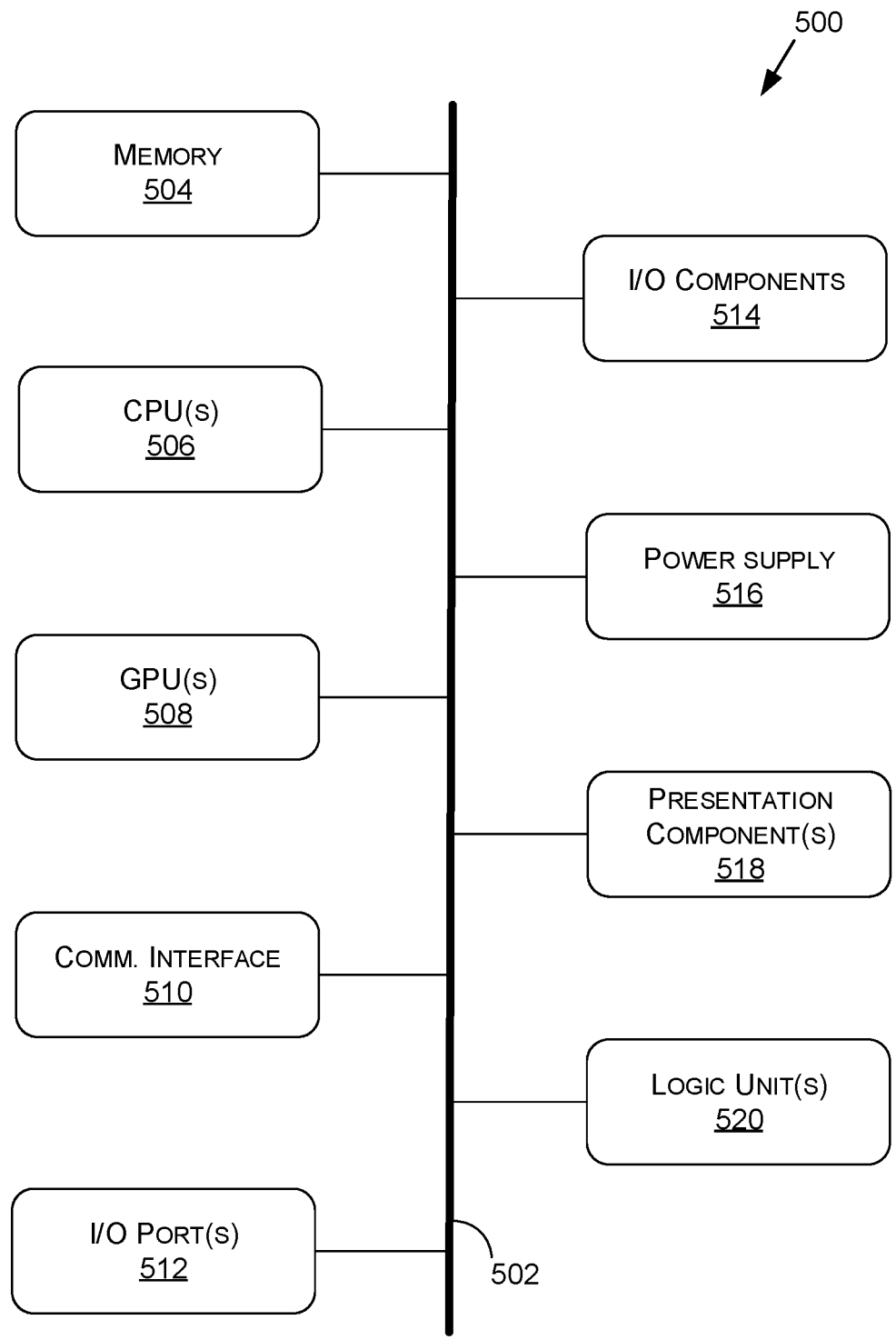
FIG. 5 is a block diagram of an example computing device suitable for use in implementing some embodiments of the present disclosure.

FIGS. 5, 6A-6F, and 7A-7B illustrate exemplary implementations of the computing device 400 of FIG. 4. FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, I/O ports 512, input/output components 514, a power supply 516, one or more presentation components 518 (e.g., display(s)), and one or more logic units 520.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, including wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built into (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device, an edge device or other Internet of Things (IoT) device, etc. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 6A:
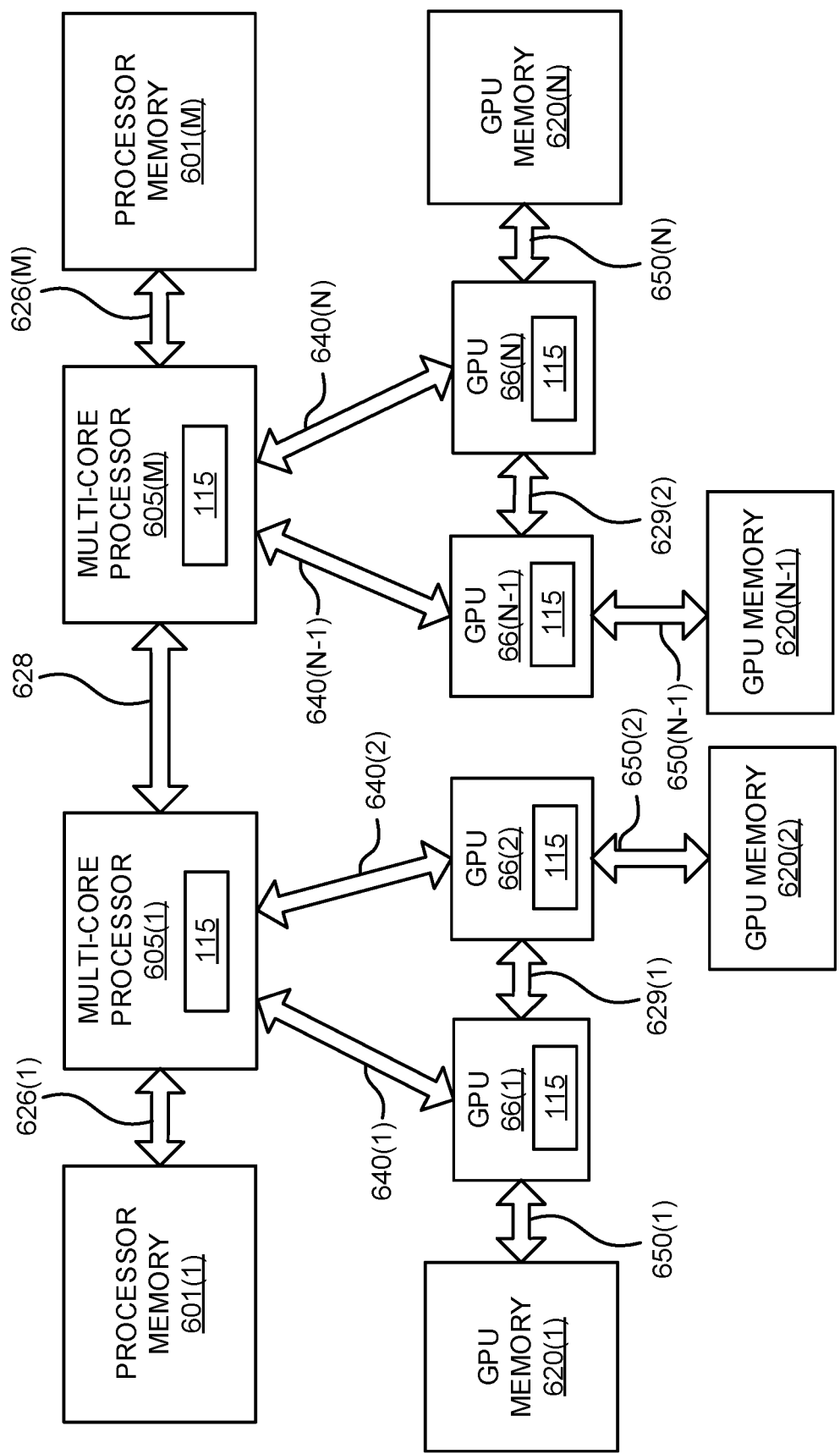
FIGS. 6A-6D each illustrate an exemplary computer system for use in implementing some embodiments of the present disclosure.

FIG. 6A illustrates an exemplary architecture in which a plurality of GPUs 610(1)-610(N) is communicatively coupled to a plurality of multi-core processors 605(1)-605(M) over high-speed links 640(1)-640(N) (e.g., buses, point-to-point interconnects, etc.). In at least one embodiment, high-speed links 640(1)-640(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 610 are interconnected over high-speed links 629(1)-629(2), which may be implemented using similar or different protocols/links than those used for high-speed links 640(1)-640(N). Similarly, two or more of multi-core processors 605 may be connected over a high-speed link 628 which may be symmetric multi-processor (SMP) buses operating at 20 GB/s, 30 GB/s, 120 GB/s or higher. Alternatively, all communication between various system components shown in FIG. 6A may be accomplished using similar protocols/links (e.g., over a common interconnection fabric).

In at least one embodiment, each multi-core processor 605 is communicatively coupled to a processor memory 601(1)-601(M), via memory interconnects 626(1)-626(M), respectively, and each GPU 610(1)-610(N) is communicatively coupled to GPU memory 620(1)-620(N) over GPU memory interconnects 650(1)-650(N), respectively. In at least one embodiment, memory interconnects 626 and 650 may utilize similar or different memory access technologies. By way of example, and not limitation, processor memories 601(1)-601(M) and GPU memories 620 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 601 may be volatile memory and another portion may be non-volatile memory (e.g., using a two-level memory (2LM) hierarchy).

As described herein, although various multi-core processors 605 and GPUs 610 may be physically coupled to a particular memory 601, 620, respectively, and/or a unified memory architecture may be implemented in which a virtual system address space (also referred to as "effective address" space) is distributed among various physical memories. For example, processor memories 601(1)-601(M) may each comprise 64 GB of system memory address space and GPU memories 620(1)-620(N) may each comprise 32 GB of system memory address space resulting in a total of 256 GB addressable memory when M=2 and N=4. Other values for N and M are possible.

Figure 6B:
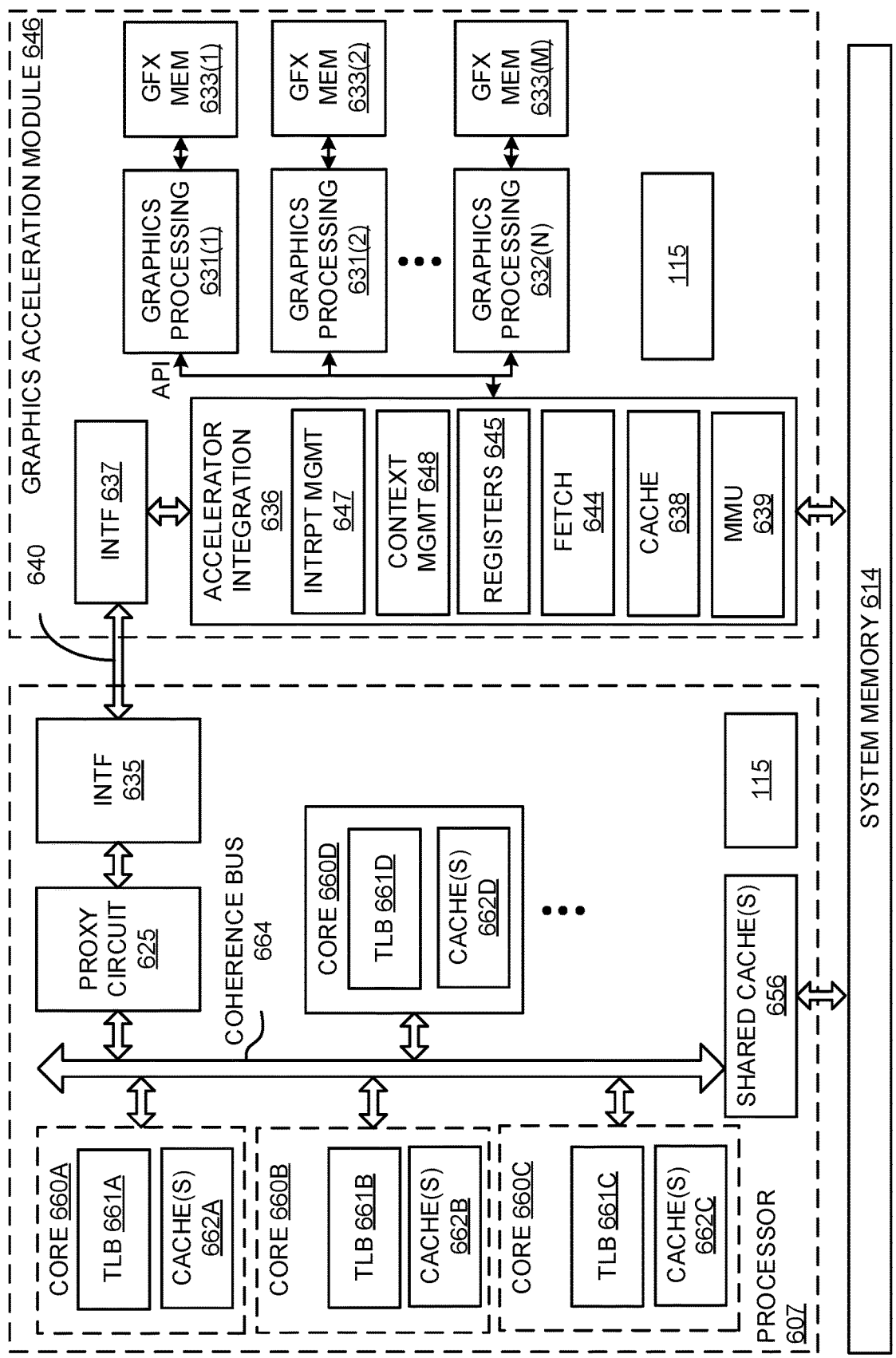

FIG. 6B illustrates additional details for an interconnection between a multi-core processor 607 and a graphics acceleration module 646 in accordance with one exemplary embodiment. In at least one embodiment, graphics acceleration module 646 may include one or more GPU chips integrated on a line card which is coupled to processor 607 via high-speed link 640 (e.g., a PCIe bus, NVLink, etc.). In at least one embodiment, graphics acceleration module 646 may alternatively be integrated on a package or chip with processor 607.

In at least one embodiment, processor 607 includes a plurality of cores 660A-660D, each with a translation lookaside buffer ("TLB") 661A-661D and one or more caches 662A-662D. In at least one embodiment, cores 660A-660D may include various other components for executing instructions and processing data that are not illustrated. In at least one embodiment, caches 662A-662D may comprise Level 1 (L1) and Level 2 (L2) caches. In addition, one or more shared caches 656 may be included in caches 662A-662D and shared by sets of cores 660A-660D. For example, one embodiment of processor 607 includes 24 cores, each with its own L1 cache, twelve shared L2 caches, and twelve shared L3 caches. In this embodiment, one or more L2 and L3 caches are shared by two adjacent cores. In at least one embodiment, processor 607 and graphics acceleration module 646 connect with system memory 614, which may include processor memories 601(1)-601(M) of FIG. 6A.

In at least one embodiment, coherency is maintained for data and instructions stored in various caches 662A-662D, 656 and system memory 614 via inter-core communication over a coherence bus 664. In at least one embodiment, for example, each cache may have cache coherency logic/circuitry associated therewith to communicate to over coherence bus 664 in response to detected reads or writes to particular cache lines. In at least one embodiment, a cache snooping protocol is implemented over coherence bus 664 to snoop cache accesses.

In at least one embodiment, a proxy circuit 625 communicatively coupled graphics acceleration module 646 to coherence bus 664, allowing graphics acceleration module 646 to participate in a cache coherence protocol as a peer of cores 660A-660D. In particular, in at least one embodiment, an interface 635 provides connectivity to proxy circuit 625 over high-speed link 640 and an interface 637 connects graphics acceleration module 646 to high-speed link 640.

In at least one embodiment, an accelerator integration circuit 636 provides cache management, memory access, context management, and interrupt management services on behalf of a plurality of graphics processing engines 631(1)-631(N) of graphics acceleration module 646. In at least one embodiment, graphics processing engines 631(1)-631(N) may each comprise a separate graphics processing unit (GPU). In at least one embodiment, graphics processing engines 631(1)-631(N) alternatively may comprise different types of graphics processing engines within a GPU, such as graphics execution units, media processing engines (e.g., video encoders/decoders), samplers, and blit engines. In at least one embodiment, graphics acceleration module 646 may be a GPU with a plurality of graphics processing engines 631(1)-631(N) or graphics processing engines 631 (1)-631(N) may be individual GPUs integrated on a common package, line card, or chip.

In at least one embodiment, accelerator integration circuit 636 includes a memory management unit (MMU) 639 for performing various memory management functions such as virtual-to-physical memory translations (also referred to as effective-to-real memory translations) and memory access protocols for accessing system memory 614. In at least one embodiment, MMU 639 may also include a translation lookaside buffer (TLB) (not shown) for caching virtual/effective to physical/real address translations. In at least one embodiment, a cache 638 can store commands and data for efficient access by graphics processing engines 631(1)-631(N). In at least one embodiment, data stored in cache 638 and graphics memories 633(1)-633(M) is kept coherent with core caches 662A-662D, 656 and system memory 614, possibly using a fetch unit 644. As mentioned, this may be accomplished via proxy circuit 625 on behalf of cache 638 and memories 633(1)-633(M) (e.g., sending updates to cache 638 related to modifications/accesses of cache lines on processor caches 662A-662D, 656 and receiving updates from cache 638).

In at least one embodiment, a set of registers 645 store context data for threads executed by graphics processing engines 631(1)-631(N) and a context management circuit 648 manages thread contexts. For example, context management circuit 648 may perform save and restore operations to save and restore contexts of various threads during contexts switches (e.g., where a first thread is saved and a second thread is stored so that a second thread can be execute by a graphics processing engine). For example, on a context switch, context management circuit 648 may store current register values to a designated region in memory (e.g., identified by a context pointer). It may then restore register values when returning to a context. In at least one embodiment, an interrupt management circuit 647 receives and processes interrupts received from system devices.

In at least one embodiment, virtual/effective addresses from a graphics processing engine 631 are translated to real/physical addresses in system memory 614 by MMU 639. In at least one embodiment, accelerator integration circuit 636 supports multiple (e.g., 4, 8, 16) graphics accelerator modules 646 and/or other accelerator devices. In at least one embodiment, graphics accelerator module 646 may be dedicated to a single application executed on processor 607 or may be shared between multiple applications. In at least one embodiment, a virtualized graphics execution environment is presented in which resources of graphics processing engines 631(1)-631(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 636 performs as a bridge to a system for graphics acceleration module 646 and provides address translation and system memory cache services. In addition, in at least one embodiment, accelerator integration circuit 636 may provide virtualization facilities for a host processor to manage virtualization of graphics processing engines 631(1)-631(N), interrupts, and memory management.

In at least one embodiment, because hardware resources of graphics processing engines 631(1)-631(N) are mapped explicitly to a real address space seen by host processor 607, any host processor can address these resources directly using an effective address value. In at least one embodiment, one function of accelerator integration circuit 636 is physical separation of graphics processing engines 631(1)-631(N) so that they appear to a system as independent units.

In at least one embodiment, one or more graphics memories 633(1)-633(M) are coupled to each of graphics processing engines 631(1)-631(N), respectively and N=M. In at least one embodiment, graphics memories 633(1)-633(M) store instructions and data being processed by each of graphics processing engines 631(1)-631(N). In at least one embodiment, graphics memories 633(1)-633(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 640, biasing techniques can be used to ensure that data stored in graphics memories 633(1)-633(M) is data that will be used most frequently by graphics processing engines 631(1)-631(N) and preferably not used by cores 660A-660D (at least not frequently). Similarly, in at least one embodiment, a biasing mechanism attempts to keep data needed by cores (and preferably not graphics processing engines 631(1)-631(N)) within caches 662A-662D, 656 and system memory 614.

Figure 6C:
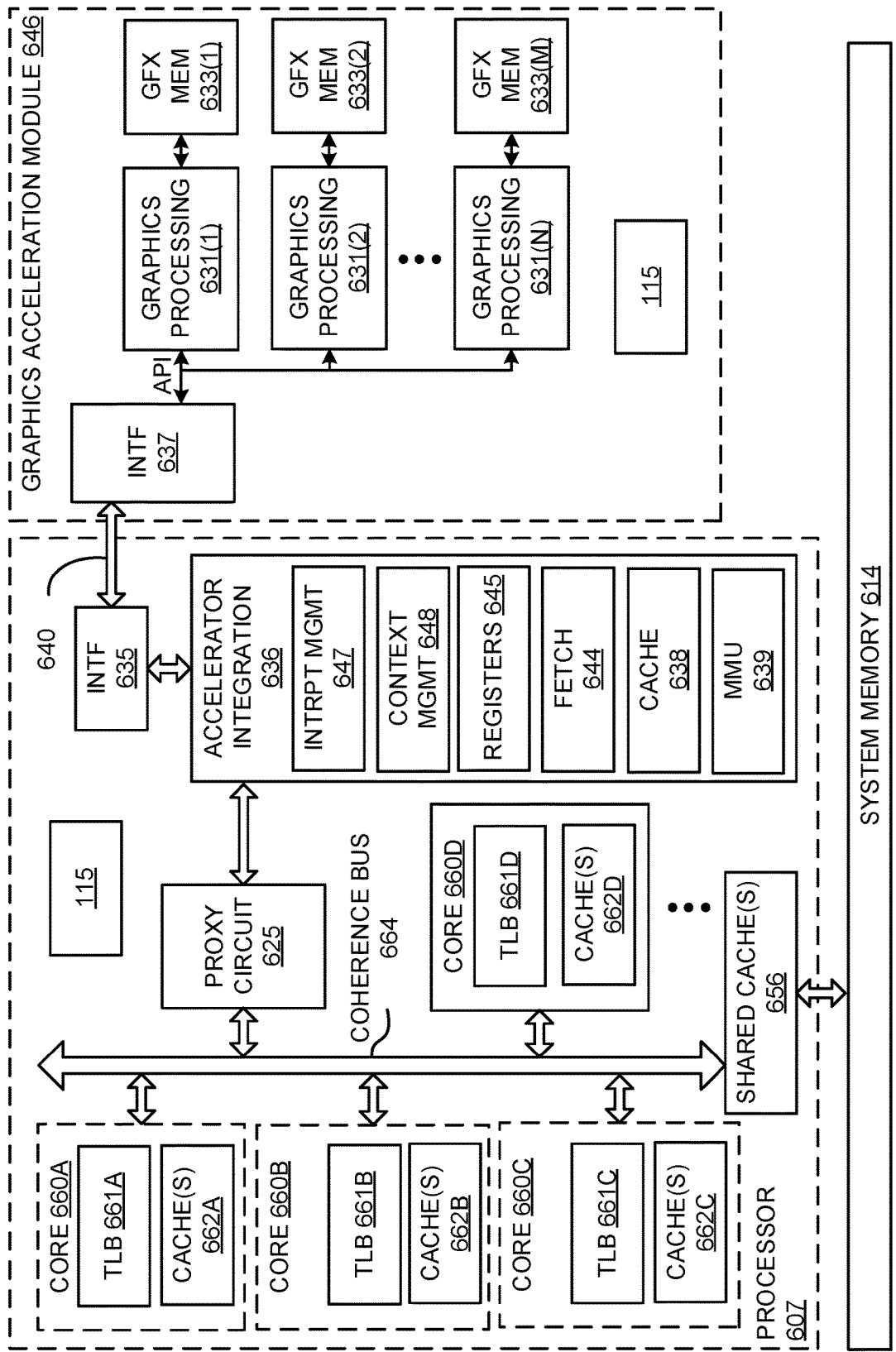

FIG. 6C illustrates another exemplary embodiment in which accelerator integration circuit 636 is integrated within processor 607. In this embodiment, graphics processing engines 631(1)-631(N) communicate directly over high-speed link 640 to accelerator integration circuit 636 via interface 637 and interface 635 (which, again, may be any form of bus or interface protocol). In at least one embodiment, accelerator integration circuit 636 may perform similar operations as those described with respect to FIG. 6B, but potentially at a higher throughput given its close proximity to coherence bus 664 and caches 662A-662D, 656. In at least one embodiment, an accelerator integration circuit supports different programming models including a dedicated-process programming model (no graphics acceleration module virtualization) and shared programming models (with virtualization), which may include programming models which are controlled by accelerator integration circuit 636 and programming models which are controlled by graphics acceleration module 646.

In at least one embodiment, graphics processing engines 631(1)-631(N) are dedicated to a single application or process under a single operating system. In at least one embodiment, a single application can funnel other application requests to graphics processing engines 631(1)-631(N), providing virtualization within a VM/partition.

In at least one embodiment, graphics processing engines 631(1)-631(N), may be shared by multiple VM/application partitions. In at least one embodiment, shared models may use a system hypervisor to virtualize graphics processing engines 631(1)-631(N) to allow access by each operating system. In at least one embodiment, for single-partition systems without a hypervisor, graphics processing engines 631(1)-631(N) are owned by an operating system. In at least one embodiment, an operating system can virtualize graphics processing engines 631(1)-631(N) to provide access to each process or application.

In at least one embodiment, graphics acceleration module 646 or an individual graphics processing engine 631(1)-631(N) selects a process element using a process handle. In at least one embodiment, process elements are stored in system memory 614 and are addressable using an effective address to real address translation technique described herein. In at least one embodiment, a process handle may be an implementation-specific value provided to a host process when registering its context with graphics processing engine 631(1)-631(N) (that is, calling system software to add a process element to a process element linked list). In at least one embodiment, a lower 16-bits of a process handle may be an offset of a process element within a process element linked list.

Figure 6D:
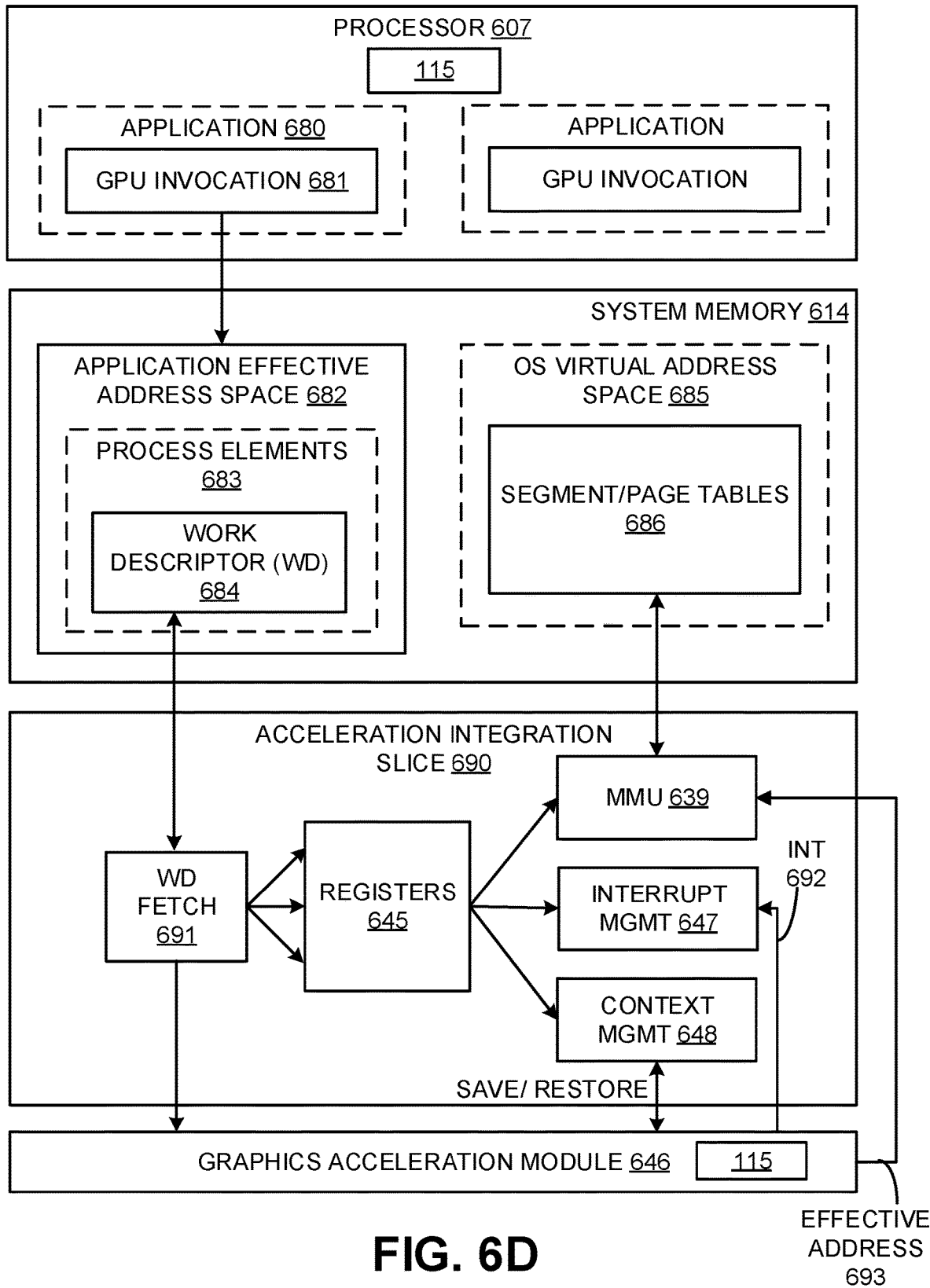

FIG. 6D illustrates an exemplary accelerator integration slice 690. In at least one embodiment, a "slice" comprises a specified portion of processing resources of accelerator integration circuit 636. In at least one embodiment, an application is effective address space 682 within system memory 614 stores process elements 683. In at least one embodiment, process elements 683 are stored in response to GPU invocations 681 from applications 680 executed on processor 607. In at least one embodiment, a process element 683 contains process state for corresponding application 680. In at least one embodiment, a work descriptor (WD) 684 contained in process element 683 can be a single job requested by an application or may contain a pointer to a queue of jobs. In at least one embodiment, WD 684 is a pointer to a job request queue in an application's effective address space 682.

In at least one embodiment, graphics acceleration module 646 and/or individual graphics processing engines 631(1)-631(N) can be shared by all or a subset of processes in a system. In at least one embodiment, an infrastructure for setting up process states and sending a WD 684 to a graphics acceleration module 646 to start a job in a virtualized environment may be included.

In at least one embodiment, a dedicated-process programming model is implementation-specific. In at least one embodiment, in this model, a single process owns graphics acceleration module 646 or an individual graphics processing engine 631. In at least one embodiment, when graphics acceleration module 646 is owned by a single process, a hypervisor initializes accelerator integration circuit 636 for an owning partition and an operating system initializes accelerator integration circuit 636 for an owning process when graphics acceleration module 646 is assigned.

In at least one embodiment, in operation, a WD fetch unit 691 in accelerator integration slice 690 fetches next WD 684, which includes an indication of work to be done by one or more graphics processing engines of graphics acceleration module 646. In at least one embodiment, data from WD 684 may be stored in registers 645 and used by MMU 639, interrupt management circuit 647 and/or context management circuit 648 as illustrated. For example, one embodiment of MMU 639 includes segment/page walk circuitry for accessing segment/page tables 686 within an OS virtual address space 685. In at least one embodiment, interrupt management circuit 647 may process interrupt events 692 received from graphics acceleration module 646. In at least one embodiment, when performing graphics operations, an effective address 693 generated by a graphics processing engine 631(1)-631(N) is translated to a real address by MMU 639.

In at least one embodiment, registers 645 are duplicated for each graphics processing engine 631(1)-631(N) and/or graphics acceleration module 646 and may be initialized by a hypervisor or an operating system. In at least one embodiment, each of these duplicated registers may be included in an accelerator integration slice 690. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 684 is specific to a particular graphics acceleration module 646 and/or graphics processing engines 631(1)-631(N). In at least one embodiment, it contains all information required by a graphics processing engine 631(1)-631(N) to do work, or it can be a pointer to a memory location where an application has set up a command queue of work to be completed.

Figure 6E:
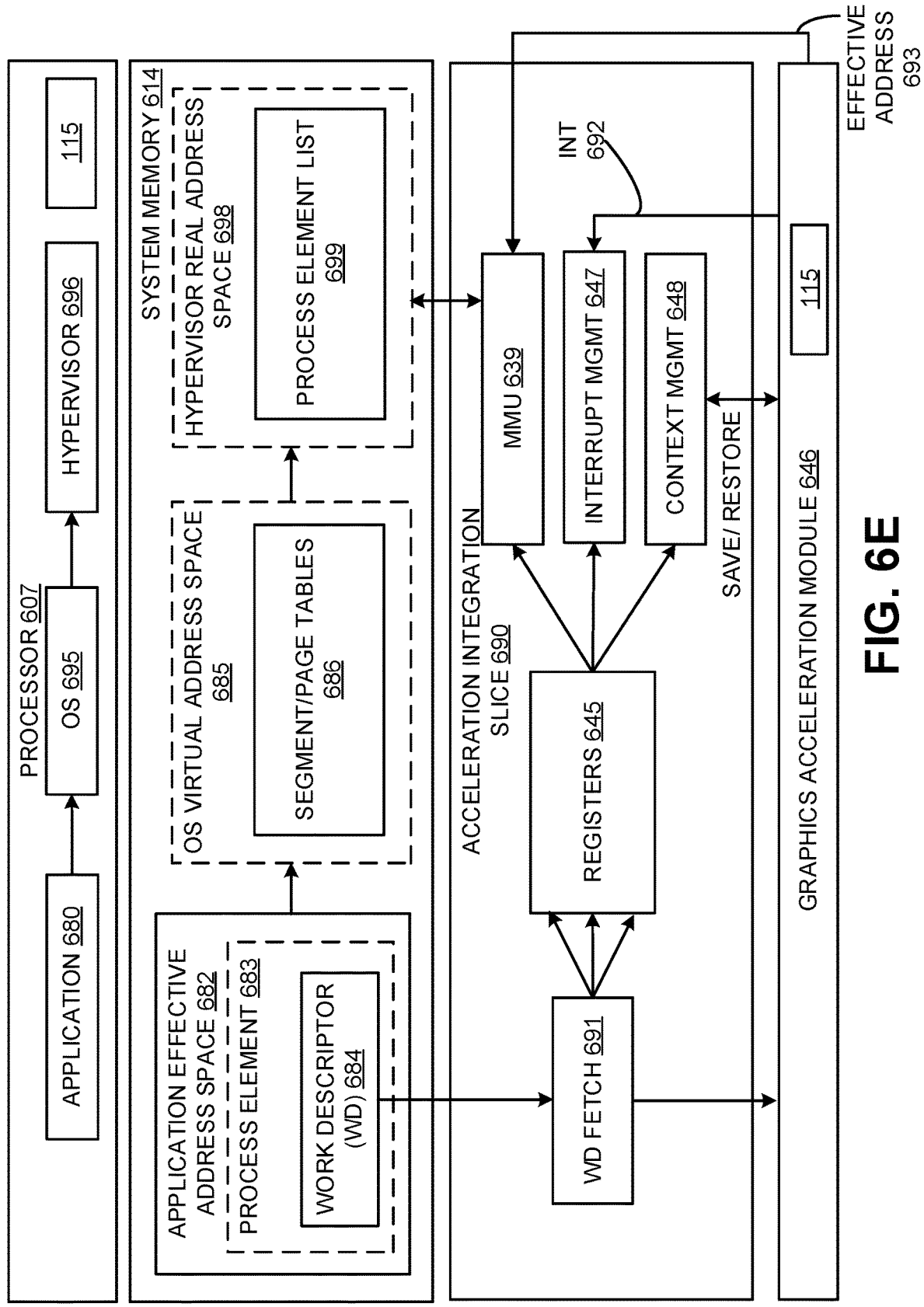
FIGS. 6E-6F illustrate a shared programming model, in accordance with some embodiments of the present disclosure.

FIG. 6E illustrates additional details for one exemplary embodiment of a shared model. This embodiment includes a hypervisor real address space 698 in which a process element list 699 is stored. In at least one embodiment, hypervisor real address space 698 is accessible via a hypervisor 696 which virtualizes graphics acceleration module engines for operating system 695.

In at least one embodiment, shared programming models allow for all or a subset of processes from all or a subset of partitions in a system to use a graphics acceleration module 646. In at least one embodiment, there are two programming models where graphics acceleration module 646 is shared by multiple processes and partitions, namely time-sliced shared and graphics directed shared.

In at least one embodiment, in this model, system hypervisor 696 owns graphics acceleration module 646 and makes its function available to all operating systems 695. In at least one embodiment, for a graphics acceleration module 646 to support virtualization by system hypervisor 696, graphics acceleration module 646 may adhere to certain requirements, such as (1) an application's job request must be autonomous (that is, state does not need to be maintained between jobs), or graphics acceleration module 646 must provide a context save and restore mechanism, (2) an application's job request is guaranteed by graphics acceleration module 646 to complete in a specified amount of time, including any translation faults, or graphics acceleration module 646 provides an ability to preempt processing of a job, and (3) graphics acceleration module 646 must be guaranteed fairness between processes when operating in a directed shared programming model.

In at least one embodiment, application 680 is required to make an operating system 695 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 646 and can be in a form of a graphics acceleration module 646 command, an effective address pointer to a user-defined structure, an effective address pointer to a queue of commands, or any other data structure to describe work to be done by graphics acceleration module 646.

In at least one embodiment, an AMR value is an AMR state to use for a current process. In at least one embodiment, a value passed to an operating system is similar to an application setting an AMR. In at least one embodiment, if accelerator integration circuit 636 (not shown) and graphics acceleration module 646 implementations do not support a User Authority Mask Override Register (UAMOR), an operating system may apply a current UAMOR value to an AMR value before passing an AMR in a hypervisor call. In at least one embodiment, hypervisor 696 may optionally apply a current Authority Mask Override Register (AMOR) value before placing an AMR into process element 683. In at least one embodiment, CSRP is one of registers 645 containing an effective address of an area in an application's effective address space 682 for graphics acceleration module 646 to save and restore context state. In at least one embodiment, this pointer is optional if no state is required to be saved between jobs or when a job is preempted. In at least one embodiment, context save/restore area may be pinned system memory.

Upon receiving a system call, operating system 695 may verify that application 680 has registered and been given authority to use graphics acceleration module 646. In at least one embodiment, operating system 695 then calls hypervisor 696 with information shown in Table 3.

TABLE 3

OS to Hypervisor Call Parameters

| Parameter # | Description |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 696 verifies that operating system 695 has registered and been given authority to use graphics acceleration module 646. In at least one embodiment, hypervisor 696 then puts process element 683 into a process element linked list for a corresponding graphics acceleration module 646 type. In at least one embodiment, a process element may include information shown in Table 4.

TABLE 4

Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 690 registers 645.

Figure 6F:
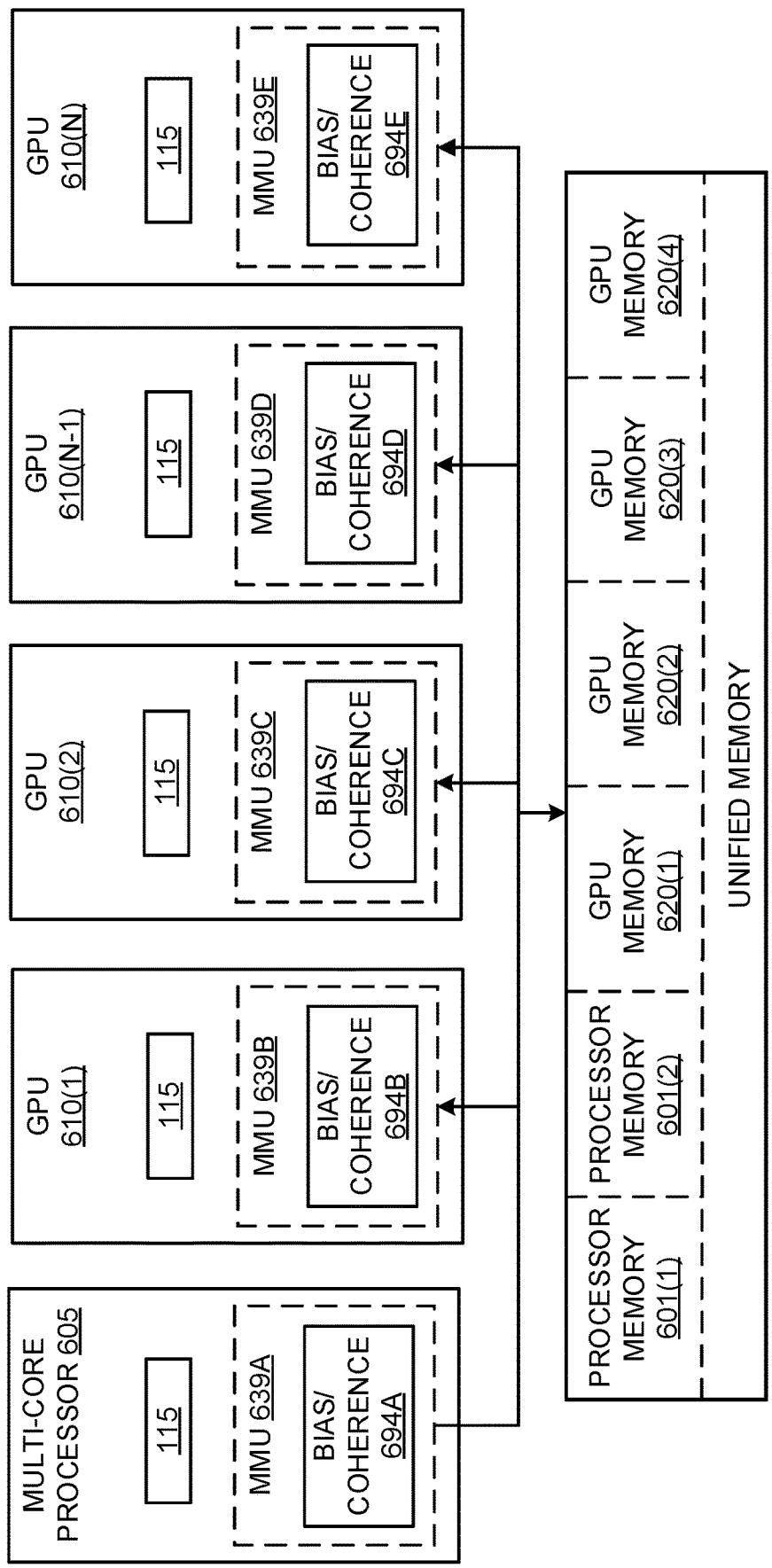

As illustrated in FIG. 6F, in at least one embodiment, a unified memory is used, addressable via a common virtual memory address space used to access physical processor memories 601(1)-601(N) and GPU memories 620(1)-620(N). In this implementation, operations executed on GPUs 610(1)-610(N) utilize a same virtual/effective memory address space to access processor memories 601(1)-601(M) and vice versa, thereby simplifying programmability. In at least one embodiment, a first portion of a virtual/effective address space is allocated to processor memory 601(1), a second portion to second processor memory 601(N), a third portion to GPU memory 620(1), and so on. In at least one embodiment, an entire virtual/effective memory space (sometimes referred to as an effective address space) is thereby distributed across each of processor memories 601 and GPU memories 620, allowing any processor or GPU to access any physical memory with a virtual address mapped to that memory.

In at least one embodiment, bias/coherence management circuitry 694A-694E within one or more of MMUs 639A-639E ensures cache coherence between caches of one or more host processors (e.g., 605) and GPUs 610 and implements biasing techniques indicating physical memories in which certain types of data should be stored. In at least one embodiment, while multiple instances of bias/coherence management circuitry 694A-694E are illustrated in FIG. 6F, bias/coherence circuitry may be implemented within an MMU of one or more host processors 605 and/or within accelerator integration circuit 636.

One embodiment allows GPU memories 620 to be mapped as part of system memory, and accessed using shared virtual memory (SVM) technology, but without suffering performance drawbacks associated with full system cache coherence. In at least one embodiment, an ability for GPU memories 620 to be accessed as system memory without onerous cache coherence overhead provides a beneficial operating environment for GPU offload. In at least one embodiment, this arrangement allows software of host processor 605 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 620 without cache coherence overheads can be critical to execution time of an offloaded computation. In at least one embodiment, in cases with substantial streaming write memory traffic, for example, cache coherence overhead can significantly reduce an effective write bandwidth seen by a GPU 610. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 620, with or without a bias cache in a GPU 610 (e.g., to cache frequently/recently used entries of a bias table). Alternatively, in at least one embodiment, an entire bias table may be maintained within a GPU.

In at least one embodiment, a bias table entry associated with each access to a GPU attached memory 620 is accessed prior to actual access to a GPU memory, causing following operations. In at least one embodiment, local requests from a GPU 610 that find their page in GPU bias are forwarded directly to a corresponding GPU memory 620. In at least one embodiment, local requests from a GPU that find their page in host bias are forwarded to processor 605 (e.g., over a high-speed link as described herein). In at least one embodiment, requests from processor 605 that find a requested page in host processor bias complete a request like a normal memory read. Alternatively, requests directed to a GPU-biased page may be forwarded to a GPU 610. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 605 bias to GPU bias, but is not for an opposite transition.

In at least one embodiment, cache coherency is maintained by temporarily rendering GPU-biased pages uncacheable by host processor 605. In at least one embodiment, to access these pages, processor 605 may request access from GPU 610, which may or may not grant access right away. In at least one embodiment, thus, to reduce communication between processor 605 and GPU 610 it is beneficial to ensure that GPU-biased pages are those which are required by a GPU but not host processor 605 and vice versa.

Figure 7A:
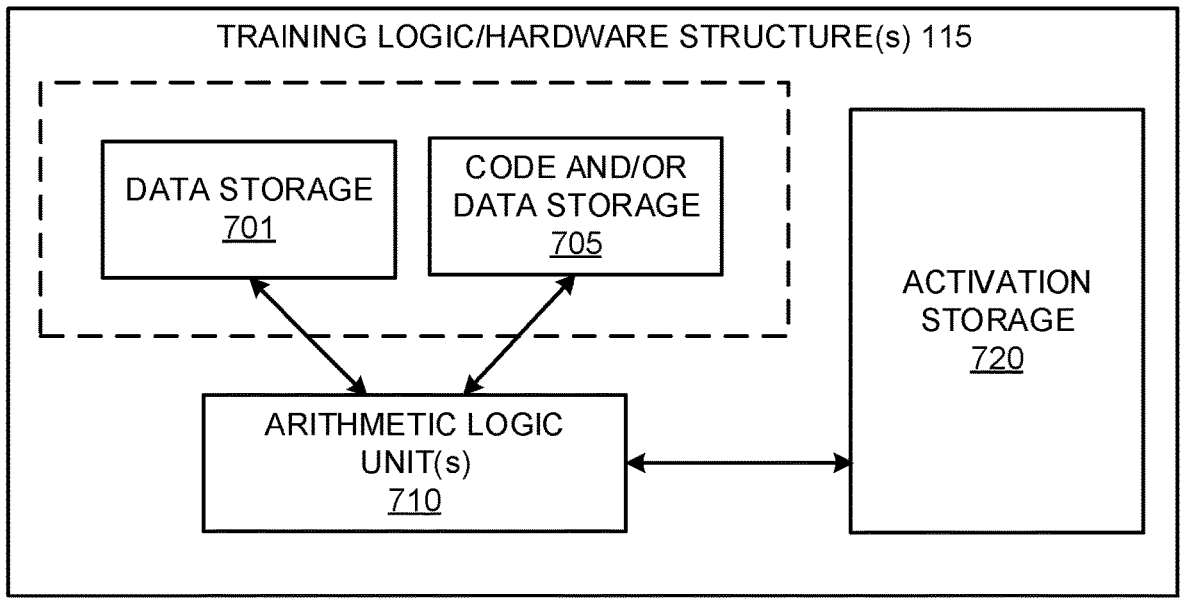
FIGS. 7A-7B each illustrate inference and/or training logic in accordance with some embodiments of the disclosure.

Hardware structure(s) 115 are used to perform one or more embodiments. FIG. 7A illustrates inference and/or training logic 115 used to perform inferencing and/or training operations associated with one or more embodiments. Details regarding inference and/or training logic 115 are provided below in conjunction with FIGS. 7A and/or 7B.

In at least one embodiment, inference and/or training logic 115 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 115 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 115 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 115 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a coprocessor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 7A may be used in conjunction with central processing unit ("CPU") hardware, graphics processing unit ("GPU") hardware or other hardware, such as field programmable gate arrays ("FPGAs").

Figure 7B:
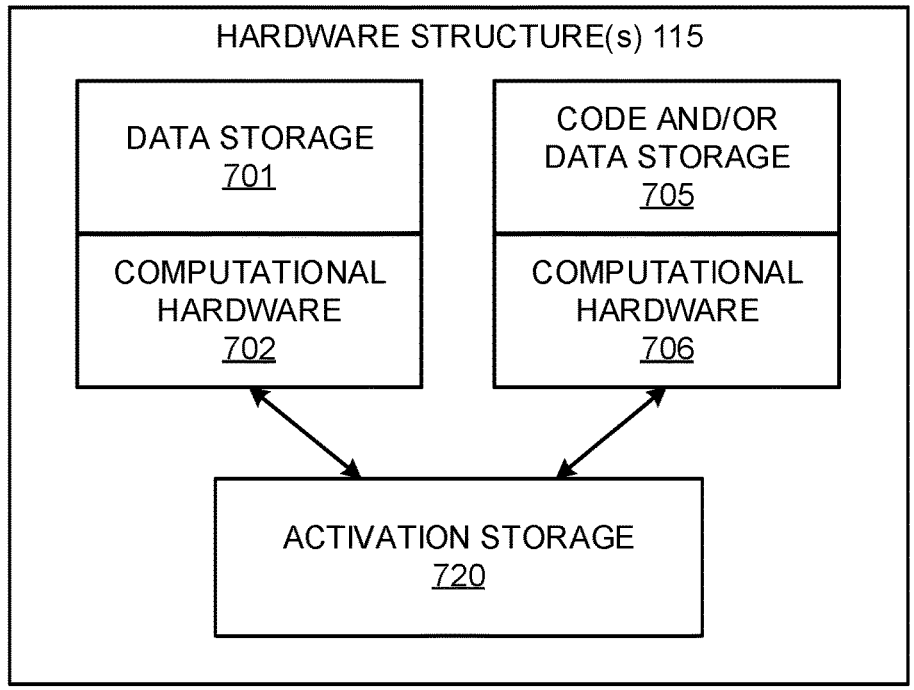

FIG. 7B illustrates inference and/or training logic 115, according to at least one embodiment. In at least one embodiment, inference and/or training logic 115 may include, without limitation, hardware logic in which computational resources are dedicated or otherwise exclusively used in conjunction with weight values or other information corresponding to one or more layers of neurons within a neural network. In at least one embodiment, inference and/or training logic 115 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 115 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 115.

Figure 8:
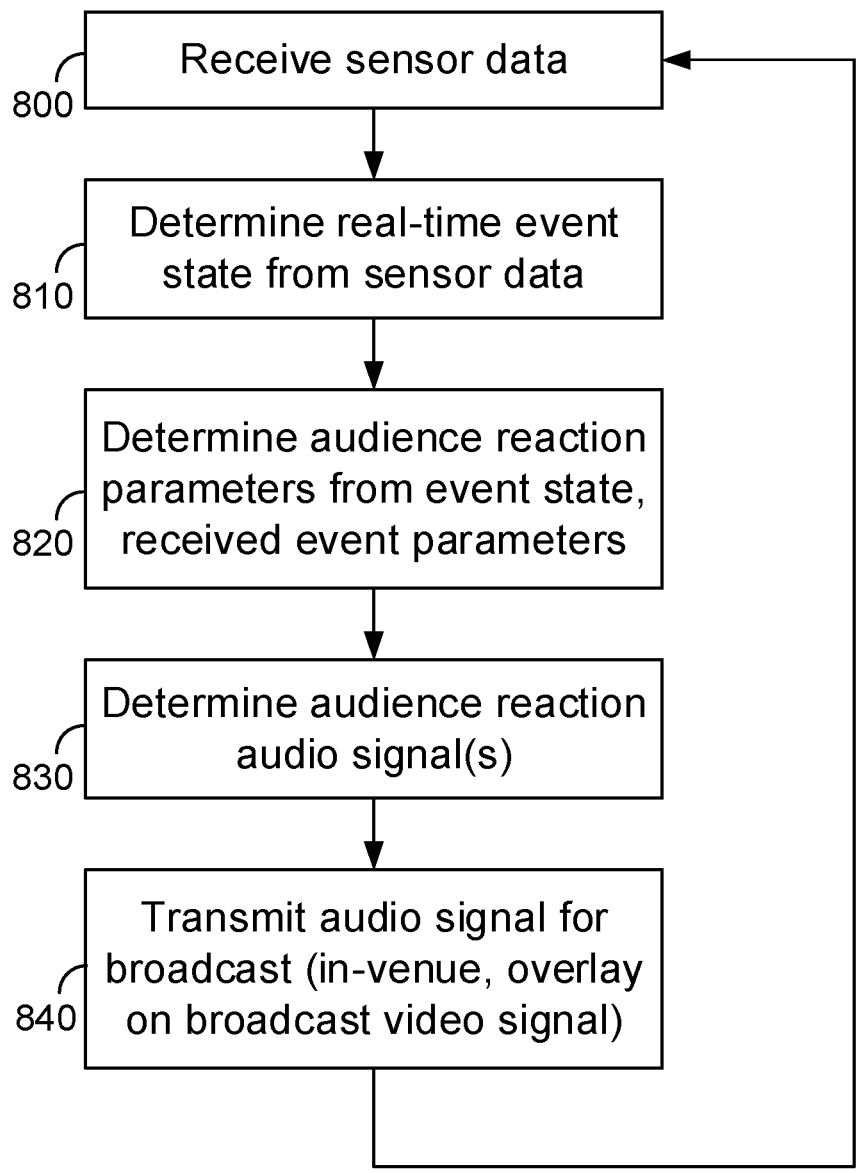
FIG. 8 is a flowchart illustrating an exemplary synthetic crowd response generation process, according to some embodiments of the disclosure.

FIG. 8 is a flowchart illustrating an exemplary synthetic crowd response generation process, according to some embodiments of the disclosure. An exemplary process may begin when processor 110 receives sensor data output from any of the sensors 100 located at an event (Step 800). This sensor data may be any data describing any event condition, such as video of any participants and the ball or any other event object, audio of any participant, sensors indicating whether the ball or any other object is in-bounds, or the like.

The processor 110 may then employ event state model 200 to determine real-time event states from this received sensor data (Step 810). As above, event state model 200 may derive any desired event states from the input sensor data, such as whether a goal was scored, spoken words, the identities of who performed any actions, i.e., the identity of the goal scorer, actor, or speaker, poses or actions taken, such as celebratory dances, taunts, and the like.

The processor 110 then may determine any audience reaction parameters from these event states, and from any other received event parameters, such as the current score, event conditions, time remaining, and the importance of the event, e.g., whether it is a playoff game, or the like (Step 820). As above, audience reaction parameters may be determined according to a reaction model 210 employing one or more neural networks such as CNNs trained to determine values of audience reaction parameters from input event state information.

Once audience reaction parameters are determined, such as reaction type and volume, an audio model 220 determines a corresponding audio signal (Step 830), such as by retrieving corresponding audio clips specified by the reaction parameters, and amplifying them to the level specified. This signal may then be transmitted for broadcast (Step 840) at the event venue to enhance the experience of the event participants and any spectators, as well as to any remote viewers to enhance their experience. This process may continuously repeat in substantial real-time, as new sensor data is received.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any sensor data may be employed, from which any event state properties may be determined. In turn, these event state properties may be employed to determine any audience reaction parameters of any type or kind, to generate synthetic audience reactions of any type. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
generating, using one or more machine learning models, one or more reaction parameters for an event substantially in real time, the one or more machine learning models having as inputs a current state of the event and event information, and having as output at least one reaction parameter of the one or more reaction parameters, the at least one reaction parameter indicating a simulated reaction of a crowd to the current state of the event and representing a crowd noise type for the simulated reaction;
selecting, using the one or more machine learning models and based at least on the at least one reaction parameter, the crowd noise type from a plurality of crowd noise types; and
determining audio data representing the simulated reaction of the crowd and having the crowd noise type based at least on the selecting of the crowd noise type.

2. The method of claim 1, wherein the plurality of crowd noise types include a cheer noise type, a boo noise type, and a chant noise type.

3. The method of claim 2, wherein the event information comprises an audio signal detected at the event, and the audio signal detected at the event comprises one or more audio signals detected from one or more of an event participant, a coach, an event spectator, an event moderator, an event commentator, or an event referee.

4. The method of claim 1, wherein the at least one reaction parameter represents an identity of a subject of the simulated reaction and the audio data corresponds to the identity of the subject based at least on the at least one reaction parameter representing the identity of the subject.

5. The method of claim 1, wherein the determining the audio data includes retrieving an audio clip from a plurality of audio clips corresponding to the plurality of crowd noise types based at least on the audio clip corresponding to the crowd noise type and the selecting of the crowd noise type.

6. The method of claim 1, wherein the one or more machine learning models are one or more first machine learning models, and the method further comprises:
receiving one or more video recordings of the event; and
generating the current state of the event substantially in real time according to one or more second machine learning models, the one or more second machine learning models having as inputs the one or more video recordings and having as output data indicating the current state of the event.

7. The method of claim 6, wherein the one or more video recordings comprise one or more of a recording of a sideline of the event, a recording of an object of the event, a recording of a location of the event, or a recording of one or more event participants.

8. The method of claim 1, wherein the current state of the event comprises one or more of one or more participant positions, an object position, or one or more participant actions.

9. The method of claim 1, wherein the at least one reaction parameter comprises a first set of crowd noise parameters for a first event participant, a second set of crowd noise parameters for a second event participant, the first set of crowd noise parameters being different from the second set of crowd noise parameters, and the audio data represents a first portion of the simulated reaction for the first event participant determined using the first set of crowd noise parameters and a second portion of the simulated reaction for the second event participant determined using the second set of crowd noise parameters.

10. The method of claim 1, wherein the one or more machine learning models are one or more first machine learning models, and the method further comprises:
receiving one or more audio recordings of the event; and
generating the current state of the event substantially in real time, according to one or more second machine learning models having as inputs the one or more audio recordings and having as output data indicating the current state of the event.

11. The method of claim 10, wherein the one or more second machine learning models include one or more natural language processing models having as output words spoken at the event, and wherein the current state of the event comprises the words spoken at the event.

12. A system comprising:
parallel processing circuitry configured to:
generate reaction parameters for an event substantially in real time, according to one or more machine learning models having as inputs a current state of the event and event information, and having as output at least one reaction parameter of the reaction parameters, the at least one reaction parameter indicating a simulated reaction of a crowd to the current state of the event and representing a crowd noise type for the simulated reaction;
select, using the at least one reaction parameter the crowd noise type from a plurality of crowd noise types; and
determine audio data representing the simulated reaction of the crowd and having the crowd noise type based at least on the selecting of the crowd noise type.

13. The system of claim 12, wherein the event information comprises one or more of an identity of at least one event participant, a time remaining in the event, a score, an identity of home and visiting participants, an importance level of the event, or an audio signal detected at the event.

14. The system of claim 13, wherein the audio signal detected at the event comprises audio signals detected from one or more of an event participant, a coach, an event spectator, an event moderator, an event commentator, or an event referee.

15. The system of claim 12, wherein the at least one reaction parameter represents a participant identity for the simulated reaction.

16. The system of claim 12, wherein the event comprises one or more of a sporting event, an entertainment event, a political event, or a broadcast program.

17. The system of claim 12, wherein the one or more machine learning models are one or more first machine learning models, and the parallel processing circuitry is further configured to:
receive one or more video recordings of the event; and
generate the current state of the event substantially in real time, according to one or more second machine learning models having as inputs the one or more video recordings and having as output data indicating the current state of the event.

18. The system of claim 17, wherein the one or more video recordings comprise one or more of a recording of a sideline of the event, a recording of an object of the event, a recording of a location of the event, or a recording of one or more event participants.

19. The system of claim 12, wherein the current state of the event comprises one or more of one or more participant positions, an object position, or one or more participant actions.

20. The system of claim 12, wherein the at least one reaction parameter represents the crowd noise type for a first event participant, and a different crowd noise type than the crowd noise type for a second event participant, the audio data corresponding the crowd noise type and the different crowd noise type.

21. A processor comprising:
one or more circuits to:
analyze event data generated using at least one sensor in an environment of an event;
determine, based at least on the analyzing, a current state of the event;
generate, using one or more machine learning models and based at least on the current state of the event, output data including at least one reaction parameter indicative of a simulated reaction of a crowd to the current state of the event and representing a crowd noise type for the simulated reaction;
select, using the at least one reaction parameter, the crowd noise type from a plurality of crowd noise types; and
cause, based at least on the output data, play of audio data representing the simulated reaction of the crowd having the crowd noise type based at least on the selecting of the crowd noise type.

22. The processor of claim 21, wherein the one or more circuits are to:
generate the audio data based at least on the selecting of the crowd noise type.

* * * * *